United States Patent [19]

Decker et al.

[11] Patent Number: 5,752,747
[45] Date of Patent: May 19, 1998

[54] METHOD FOR EQUALIZING THE WEAR OF BRAKE LININGS OF A VEHICLE

[75] Inventors: Heinz Decker, Vaihingen; Werner Stumpe, Stuttgart; Heiner Gassmann, Esslingen, all of Germany

[73] Assignee: Robert Bosch GmbH, Stuttgart, Germany

[21] Appl. No.: 684,488

[22] Filed: Jul. 19, 1996

[30] Foreign Application Priority Data

Jul. 27, 1995 [DE] Germany ............. 195 27 419.9

[51] Int. Cl.$^6$ .................................. B60T 17/22
[52] U.S. Cl. .................. 303/9.62; 303/9.61; 303/113.4
[58] Field of Search .................. 303/9.61, 9.62, 303/9.69, 174; 188/1.11 R, 1.11 W, 1.11 E, 1.11 WE; 364/426.01–426.03, 424.05

[56] References Cited

U.S. PATENT DOCUMENTS

| | | | |
|---|---|---|---|
| 5,088,042 | 2/1992 | Brearley et al. ............. | 303/9.62 X |
| 5,312,168 | 5/1994 | Breen ............................ | 303/9.61 |
| 5,344,222 | 9/1994 | Helldorfer et al. ........... | 303/9.61 |
| 5,470,134 | 11/1995 | Toepfer et al. ............... | 303/9.61 |

FOREIGN PATENT DOCUMENTS

| | | |
|---|---|---|
| 0637534 | 2/1995 | European Pat. Off. . |
| 3313078 | 10/1984 | Germany . |
| 4438017 | 5/1996 | Germany . |

*Primary Examiner*—Peter M. Poon
*Attorney, Agent, or Firm*—Felfe & Lynch

[57] ABSTRACT

The extent to which the brake pedal is actuated is detected, and the braking action in the wheel brakes with the greater amount of wear is reduced as a function of this pedal actuation. The reduction in brake pressure takes place primarily in a low range of brake pressures, the amount of reduction decreasing continuously in a middle range of brake pressures, and not taking place at all at high brake pressures.

14 Claims, 3 Drawing Sheets

1

METHOD FOR EQUALIZING THE WEAR OF BRAKE LININGS OF A VEHICLE

BACKGROUND OF THE INVENTION

The invention pertains to a method for controlling the brake system of a vehicle wherein the braking action at the wheels is reduced as a function of the amount of wear at the brakes in order to equalize wear on the brake linings.

DE-OS 33 13 078 discloses a brake system of a vehicle which is controlled with the goal of equalizing the wear on the brake linings. For this purpose, electrically driven valves are installed in the brake lines of the brake circuits of the vehicle; these valves reduce the braking action at the wheel brakes showing greater wear when different lining thicknesses (that is, different degrees of wear) have been determined. In this case, the valves must be designed in such a way that the valve characteristics are properly matched to the design of the brake system in question, which is associated with a great deal of effort.

The object of the invention is to provide a control system for brake systems which can equalize the wear on the brake linings and which can be adapted easily and flexibly to brake systems of different designs.

SUMMARY OF THE INVENTION

According to the invention, an electronic control unit detects a measure of the extent to which the brake pedal is actuated by the driver, and effects the reduction in brake action as a function of the extent of pedal actuation.

The control system according to the invention makes it possible to adapt the automatic brake lining control function to brake systems of different designs. It is especially advantageous that the desired valve characteristics can be generated by electronic means. As a result, valves of simple design, i.e., proportional or switching valves, can be used.

It is thus also advantageous that it is possible to reduce the braking action in different ways in different braking situations.

It is especially advantageous that the extent to which the braking action is reduced is derived from the extent to which the brake pedal is actuated by the driver. As a result, it is possible to allow the full braking action to take effect in cases where hard braking is desired.

The method according to the invention is especially advantageous in conjunction with conventional or electrically controlled pneumatic or hydraulic brake systems.

DESCRIPTION OF THE EXEMPLARY EMBODIMENTS

Figure 1:
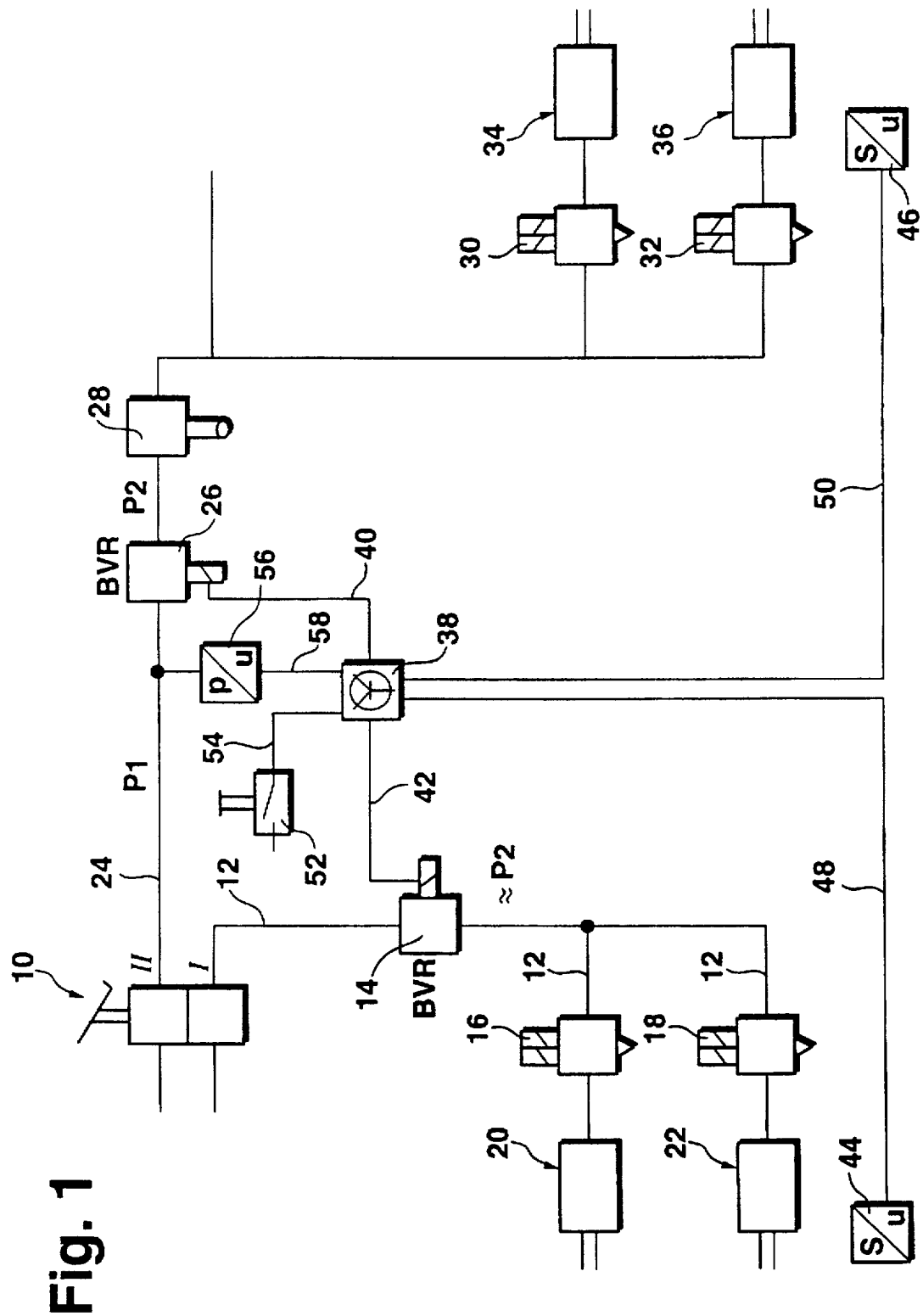
FIG. 1 shows an overall block circuit diagram of a pneumatic brake system equipped with a brake antilock and/or acceleration slip control system with valves for equalizing the wear on the brake linings.
Figure 2A:
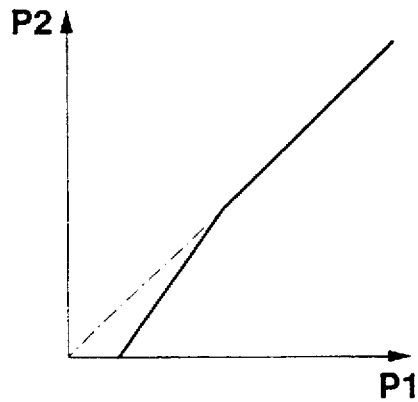
FIGS. 2a–2d show examples of suitable characteristic curves.
Figure 2B:
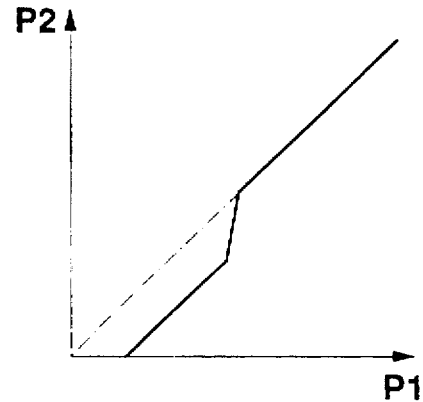
Figure 2C:
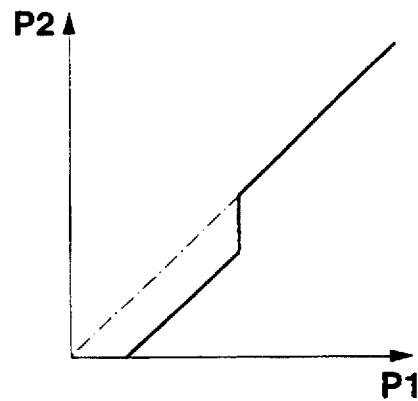
Figure 2D:
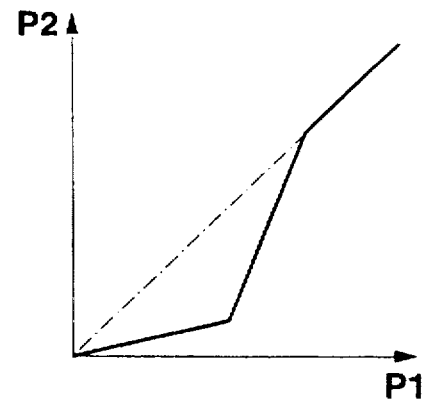

FIG. 1 shows a conventional pneumatic brake system, which is equipped with an ABS/ASR system. The brake system has a first brake circuit I for the front axle and a second brake circuit II for the rear axle. As part of brake circuit I, a brake line 12 leads from service brake valve 10 by way of an electrically driven valve 14 and pressure control valves 16, 18 to wheel brake cylinders 20, 22 of the front axle. As part of brake circuit II, a brake line 24 leads in comparable fashion by way of an electrically driven valve 26, a pressure reducer or limiter 28, and pressure control valves 30, 32 to wheel brake cylinders 34, 36 of the rear axle. The limiter 28 reduces the pressure sent to the rear brakes, to assure that the wheels of the rear axle do not lock before the wheels of the front axle. In addition, an electronic control unit 38 is provided, which actuates valves 26, 14 by way of drive lines 40, 42. A switching element 52 for detecting the actuation of the brake pedal, furthermore, is connected by line 54 to control unit 38. A pressure sensor 56 detects the pressure in one of the brake lines (24 or 12) and transmits a pressure value over line 58 to electronic control unit 38. In addition, sensors 44 and 46, which measure the thickness of the brake linings of the corresponding wheel brakes, are assigned to one or all of the front axle brakes and rear axle brakes. In the figure, only one sensor is shown at each axle. The signal values thus obtained are sent via lines 48, 50 to control unit 38.

In a preferred exemplary embodiment, electronic control unit 38 is an ABS control unit or an ABS/ASR control unit. In this preferred exemplary embodiment, the control unit 38 not only takes care of equalizing the wear as described below but also actuates valves 16, 18, 30, 32 to build up, decrease, or maintain the pressure when the wheels lock or when the drive wheels spin. For the sake of clarity, neither the corresponding connections of the lines (outputs) nor the wheel velocity sensors (inputs) are shown in FIG. 1. The valves 16, 18, 30, 32 serve only ABS/ASR functions.

The basic idea of the invention is that, when it is found that one of the brake linings is thinner than the others and therefore has undergone a greater amount of wear, electronic control unit 38 reduces the braking action in the brake circuit of that lining by driving the appropriate valve. The extent to which the pedal is actuated by the driver is detected, and the drive of the corresponding valves 14, 16 by electronic control unit 38 is carried out as a function of a predetermined characteristic, representing the relationship between the inlet pressure P1 and the outlet pressure P2 of the valve. The valves 14, 26 serve only wear equalization functions.

In a preferred exemplary embodiment, valves 14, 26 are proportional valves. In this practical application, a certain current for driving the valves is transmitted by control unit 38 over lines 40, 42 in correspondence with the characteristic. If valves 14, 26 are switching valves, however, a pulse width-modulated signal is sent by control unit 38 over lines 40, 42, the pulse-duty factor of this signal being selected so that, on average, the predetermined relationship between the inlet and outlet pressure of the valve is achieved.

The essential point about the selected characteristic curve is that a reduction in the braking action, that is, a holding-back of the pressure, is designed to occur only in lower pressure ranges. This is done so that, in the case of hard braking, which might be associated with an emergency situation, the maximum braking action determined by the design of the brake system is available.

Examples of characteristics of this type, which have been found suitable in various exemplary embodiments, are shown in FIG. 2. In each case, the pressure $P_2$ at the outlet of the valve is plotted versus the inlet pressure $P_1$. Common to all these characteristics is that the reduction in the braking action occurs in the lower pressure range, that is, in the lower actuation range of the brake pedal (up to about 30% of the maximum excursion) and possibly in the middle range (up to about 75% of the maximum excursion); the transition from the lower to the upper range (e.g., greater than 75%) can be gradual (FIGS. 2a, 2b, 2d) or abrupt (FIG. 2c), depending on the requirements.

In addition, it can be advantageous in some exemplary embodiments to have several characteristics on file. A suitable characteristic will then be selected, depending on the driving conditions of the vehicle or on the braking situation in question. The selection is carried out here on the basis of, for example, the vehicle velocity, the speed with which the brake pedal is actuated, etc., these variables being able to express situations in which the equalization of the wear is likely to be of secondary importance.

In addition to the advantageous use of the method according to the invention in conventional pneumatic brake systems, the process according to the invention can also be used in similar fashion with full benefit of the indicated advantages in hydraulic, electropneumatic, or electrohydraulic brake systems.

In addition to the detection of the pressure in at least one brake line as a measure of brake pedal actuation, it is provided in advantageous exemplary embodiments that the pressure is detected in all the brake circuits and that the valves assigned to the brake circuits be controlled as a function of the corresponding pressure.

In other advantageous exemplary embodiments, furthermore, the excursion or the actuating force directly on the brake pedal is determined by potentiometric or contactless distance sensors or force sensors as a measure of the brake pedal actuation.

Figure 3:
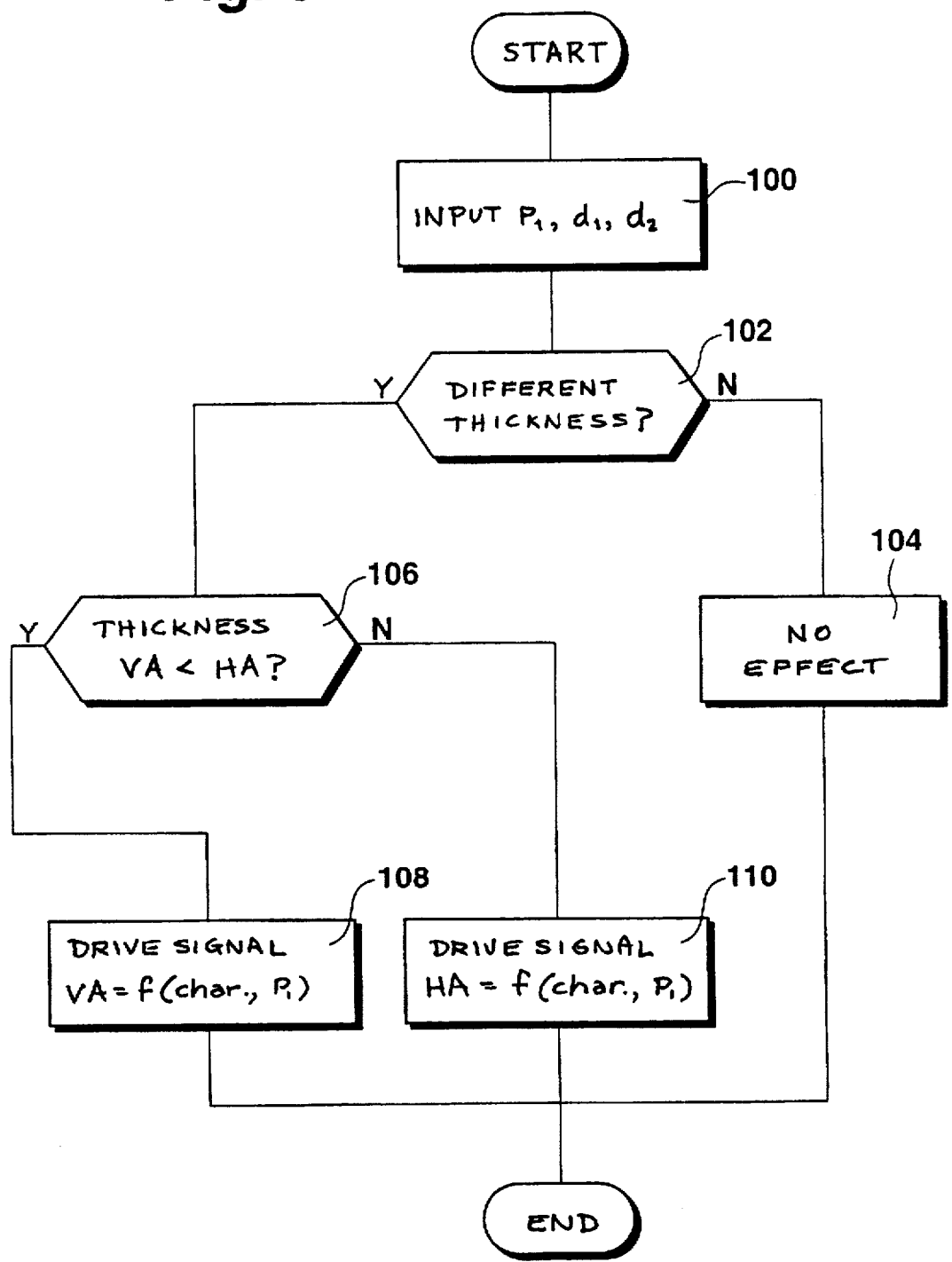
FIG. 3 is a flow chart will illustrates the realization of the invention as a computer program.

FIG. 3 shows a flow chart which illustrates a realization of the method according to the invention as a computer program. The section of the program described in the figure is initiated with the onset of the braking process, i.e., when brake pedal switch 52 closes.

In the preferred exemplary embodiment, pressure $P_1$ in one of the brake lines and the measured lining thicknesses $d_1$ and $d_2$ are accepted as input in the first step 100. Then question step 102 checks to see whether the accepted lining thicknesses $d_1$, $d_2$ differ in their values beyond a certain tolerance. If they do not, the valves 14, 26 are not driven, and this part of the program terminates. If the linings are of different thickness, the following question step 106 checks to see whether lining thickness $d_1$ on the front axle is smaller than the lining thickness $d_2$ on the rear axle. If this is the case, the drive signal for the reducing valve 14 in the front axle brake circuit is arrived at in step 108 on the basis of the predetermined characteristic as a function of the detected pressure $P_1$, and the drive signal for the reducing valve 14 is then transmitted. Depending on the design of the valve in question, the determined drive signal represents either an electric current value, a voltage value, a pulse-duty factor of a pulse width-modulated signal, a frequency, etc. If the lining on the rear axle is thinner than on the front axle, the drive signal for the reducing valve 26 in the rear axle brake circuit is determined accordingly in step 110 on the basis of the predetermined characteristic and the detected pressure $P_1$ and transmitted. After steps 108 and 110, this section of the program ends and is ready to be run again when needed.

In addition to the equalization of brake lining wear between the axles described above, the method presented above can be used to equalize the wear for the individual wheels. The wear is determined in each wheel, and the braking action at the individual wheel is reduced as a function of a predetermined characteristic in such a way that essentially the same wear occurs at all wheels, averaged over all the brakings.

The characteristics are predetermined as a function of the given boundary conditions. They can take any desired form.

What is claimed is:

1. Method for equalizing the wear of brake linings at wheels on a vehicle, said vehicle having a brake pedal adapted to be actuated by a driver, said method comprising
    determining a signal representing a measure of brake pedal actuation by the driver, said signal being generated in one of a low range, a middle range, and a high range,
    determining at least one of speed of actuation of the brake pedal and vehicle speed
    determining which brake lining has a greater amount of wear, and
    reducing brake pressure at the wheel where the brake lining has the greater amount of wear where said signal is in the low range, said reduction being in an amount dependent on at least one of the speed of brake pedal actuation and the vehicle speed,
    applying without reduction the brake pressure at the wheel where the brake lining has the greater amount of wear where the signal is in the high range, and
    changing the reduction of brake pressure continuously when said signal is in the middle range.

2. Method as in claim 1 wherein, depending on the brake pressure generated by the brake pedal, a drive signal for at least one valve for reducing brake pressure is determined from a predefined characteristic.

3. Method as in claim 2 wherein the characteristic describes the relationship between the inlet and the outlet pressure of the valve to be driven.

4. Method as in claim 2 wherein the drive signal is a current signal, a voltage signal, or a pulse width-modulated signal, depending on whether the valves are proportional or switching valves.

5. Method as in claim 1 wherein the brake system is a pneumatic or hydraulic brake system, where electrically driven valves are installed in the brake lines, these valves serving to reduce the brake pressure in the individual brake circuits.

6. Method as in claim 1 wherein an electronic control unit for driving pressure reducing valves is provided, where the electronic control unit is a brake antilock and/or acceleration skid control unit.

7. Method as in claim 1 wherein the reduction in the brake pressure depends on the speed at which the brake pedal is actuated.

8. An apparatus for equalizing wear of brake linings at wheels on a vehicle, said vehicle having a brake pedal adapted to be actuated by a driver, the apparatus comprising:
    means for determining a signal representing a degree of brake pedal actuation, said signal being generated in one of a low range, a middle range and a high range;
    means for determining at least one of speed of brake pedal actuation and vehicle speed;
    means for determining which brake lining has a greater amount of wear;
    means for reducing brake pressure at the wheel where the brake lining has a greater amount of wear where the brake pedal actuation signal is in the low range, the reduction being in an amount depending on at least one of the vehicle speed and actuation speed of the brake pedal;
    means for applying without reducing the brake pressure at the wheel where the brake lining has a greater amount of wear where the actuation signal is in the high range;

means for changing the reduction of brake pressure continuously where the actuation signal is in the middle range.

9. An apparatus as in claim 8, wherein, depending on the actuation signal, a drive signal for at least one valve for reducing brake pressure is determined from a predefined characteristic.

10. An apparatus at in claim 9, wherein the characteristic describes the relationship between the inlet and the outlet pressure of the valve to be driven.

11. An apparatus as in claim 9, wherein the drive signal is a current signal, a voltage signal, or a pulse width-modulated signal, depending on whether the valves are proportional or switching valves.

12. An apparatus as in claim 8, wherein the brake system is a pneumatic or hydraulic brake system, where electrically driven valves are installed in the brake lines, these valves serving to reduce the brake pressure in the individual brake circuits.

13. An apparatus as in claim 8, and further comprising an electronic control unit for driving pressure reducing valves, the electronic control unit being a brake antilock and/or acceleration skid control unit.

14. An apparatus as in claim 8, wherein the reduction in the brake pressure depends on the speed at which the brake pedal is actuated.

* * * * *